United States Patent [19]
Suzuki

[11] 3,716,766
[45] Feb. 13, 1973

[54] COOPERATIVE SYSTEM OF WINDSHIELD WASHER AND WIPER WITH INTERMITTENT WIPER OPERATING MECHANISM

[75] Inventor: Motoji Suzuki, Okazaki, Japan

[73] Assignee: Nippondenso Co., Ltd., Kariya-ski, Aichi-ken, Japan

[22] Filed: Dec. 15, 1971

[21] Appl. No.: 208,097

[30] Foreign Application Priority Data

Dec. 17, 1970 Japan..............................45/126674
June 3, 1971 Japan...............................46/46572

[52] U.S. Cl..............318/102, 318/DIG. 2, 318/443, 318/472
[51] Int. Cl. ..........................H02p 1/58, B60s 1/02
[58] Field of Search.........318/443, DIG. 2, 102, 472; 15/250.02

[56] References Cited

UNITED STATES PATENTS

| | | | |
|---|---|---|---|
| 3,497,790 | 2/1970 | Tixier | 318/472 X |
| 3,582,732 | 6/1971 | Kovalsky | 318/102 |
| 3,624,477 | 11/1971 | Rieman | 318/472 X |
| 3,657,618 | 4/1972 | Ori et al. | 318/102 |

Primary Examiner—Benjamin Dobeck
Attorney—Cushman, Darby & Cushman

[57] ABSTRACT

A system for cooperatively operating a windshield washer and a windshield wiper is provided which comprises a washer motor connected in series with a washer switch, a heating wire connected in parallel with said washer motor, a temperature responsive switch connected between a wiper motor and a power source and adapted to operate with a thermal time delay provided by said heating wire, and an intermittent operation switch directly connected to said heating wire, the series circuit comprising said intermittent operation switch and said heating wire being connected in parallel with said temperature responsive switch, whereby by simply closing the washer switch the washer is readily brought into operation and the wiper is also brought into operation with said thermal time delay, while on the other hand upon closing of the intermittent operation switch the wiper is intermittently operated at such intervals of time as related to said thermal time delay.

13 Claims, 7 Drawing Figures

COOPERATIVE SYSTEM OF WINDSHIELD WASHER AND WIPER WITH INTERMITTENT WIPER OPERATING MECHANISM

BACKGROUND OF THE INVENTION

1. FIELD OF THE INVENTION

The present invention relates to a system for cooperatively operating a windshield washer and a wiper for a vehicle and more particularly to a cooperative system of a washer and wiper with an intermittent wiper operating mechanism.

2. DESCRIPTION OF THE PRIOR ART

Conventional cooperative systems of windshield washers and wipers with intermittent wiper operating mechanisms include electronic systems employing semiconductor component parts such as transistors. These conventional systems have been disadvantageous in that they have required a great number of component parts and moreover the assemblage of these component parts have required a great deal of soldering operations resulting in a complicate assembly procedure and increased manufacturing cost. On the other hand, relatively inexpensive intermittent wiper operating mechanisms and cooperative systems have been heretofore known employing temperature responsive switches which make use of the thermal deflection of bimetals, for example. These conventional systems have also been disadvantageous in that they have required separate temperature responsive switches for cooperatively operating washers and wipers and for intermittently operating wipers, respectively, and thus they have been not so economic from the standpoint of manufacturing cost.

SUMMARY OF THE INVENTION

It is an object of the present invention to provide a cooperative system of a windshield washer and wiper with an intermittent wiper operating mechanism in which taking advantage of the fact that both the intermittent wiper operating mechanism and the cooperative system can be constructed with a temperature responsive switch, a single temperature responsive switch is employed to effect both the intermittent wiper operation and the cooperative operation of the washer and wiper reducing the number of the component parts and thus ensuring the system which is simple in construction and inexpensive.

It is another object of the present invention to provide a system of the type described in which a means is further provided, whereby the time for intermittently operating the wiper and the time for cooperatively operating the washer and the wiper are separately set for the temperature responsive switch serving the double functions of intermittently operating the wiper and of operating the wiper in cooperation with the washer.

According to the present invention, there is a remarkable effect in that since the wiper will be brought into operation at the expiration of a predetermined time delay after the start of the operation of the washer by simply closing the washer switch and since the wiper will be stopped from operating after a delay of a predetermined time following the stoppage of the operation of the washer, both the washer and the wiper can be operated in cooperation with each other by means of the washer switch alone and moreover it is ensured that the wiper blades necessarily come into operation to wipe the windshield which has been sprayed with a sufficient amount of a washing liquid thereby preventing damage to the glass surface and the wiper can be stopped after the washing liquid on the windshield has been completely removed following the stoppage of the washer.

There is another remarkable effect in that closing of the intermittent operation switch causes the wiper to perform the intermittent wiping operation thereby eliminating the need to take the trouble of turning the wiper switch on and off when a light rain is falling and furthermore the use of the single temperature responsive switch for the double purpose of effecting the intermittent wiping operation and the associated operation of the washer and the wiper results in a considerable reduction in the number of the component parts used and hence in a system which is simple in construction and which can be manufactured inexpensively.

DESCRIPTION OF THE PREFERRED EMBODIMENTS

Figure 1:
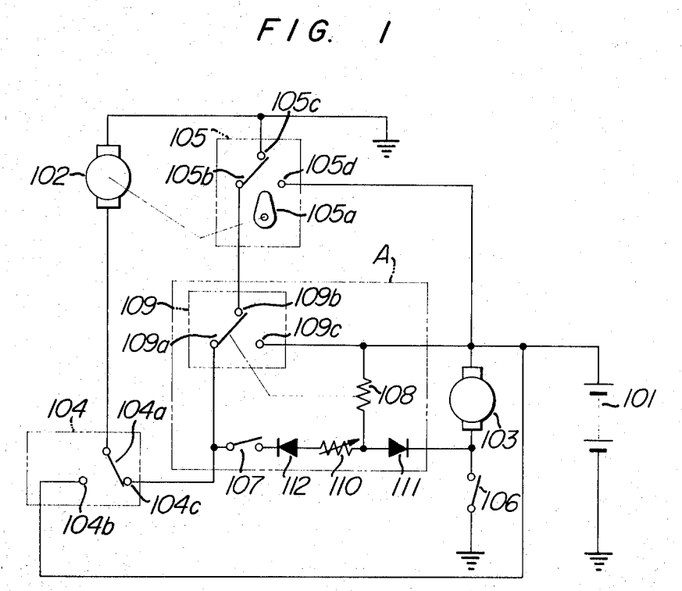
FIG. 1 is a circuit diagram showing an embodiment of the present invention as applied to a permanent magnet field type wiper motor.

Referring first to FIG. 1 numeral 101 designates a power source comprising a battery installed in a vehicle; 102 a permanent magnet field type wiper motor; 103 a permanent magnet field type washer motor; 104 a manually-operated wiper switch comprising a switch blade 104a and contacts 104b and 104c. Numeral 105 designates an automatic parking switch for stopping the wiper at a fixed stopping position, the switch being adapted such that a switch blade 105b is normally engaged with an actuating contact 105d and the switch blade 105b engages a stop contact 105c only when the wiper has been brought to the fixed position by a cam 105a. Numeral 106 designates a manually operated washer switch; 107 a switch for intermittently operating the wiper; 108 a heating wire connected in parallel with the washer motor 103; 109 a temperature responsive switch adapted such that when heated by the heating wire 108 a movable contact 109a is disengaged from a normally closed side contact 109b to engage a normally open side contact 109c at the expiration of a predetermined time, with the movable contact 109a being carried on a metal such as a bimetallic strip which moves the movable contact 109a by virtue of its thermal deflection. Numeral 110 designates a variable resistor for adjusting the period of the wiper cycle when the wiper is operated intermittently; 111 a diode for preventing the flow of current into the washer motor 103 when the intermittent operation switch 107 is closed. Numeral 112 designates a diode for preventing any large current from flowing to the ground through the temperature responsive switch 109, switch 107, variable resistor 110, diode 111 and switch 106 when the washer switch 106 is closed with the intermittent operation switch 107 in the closed position.

The operation of the circuit described above is as follows: When only the wiper is to be operated, the wiper switch 104 is connected to the contact 104b completing a circuit to the wiper motor 102 to operate it. When the wiper is to be stopped, the switch blade 104a of the wiper switch 104 is merely closed on to the contact 104c. In this case, the washer switch 106 and the intermittent operation switch 107 remain opened and thus no current is supplied to the heating wire 108 applying no heat to the temperature responsive switch 109 and thus allowing the movable contact 109a to remain connected to the contact 109b. Consequently, until the wiper is brought to the stop position, the switch blade 105b of the automatic stop switch 105 will remain connected to the contact 105d establishing a circuit through the power source 101, contact 105d, switch blade 105b, contact 109b, movable contact 109a, contact 104c, wiper switch blade 104a, wiper motor 102 and power pource 101 and thus causing the wiper motor 102 to continue operating. When the wiper comes to the stop position, the switch blade 105b of the automatic stop switch 105 is closed on to the contact 105c so that the wiper motor 102 is disconnected from the power source 101 and at the same time a closed circuit is established across the ends of its armature providing dynamic braking and thus quickly stopping the operation of the wiper motor 102.

Figures 6, 7:
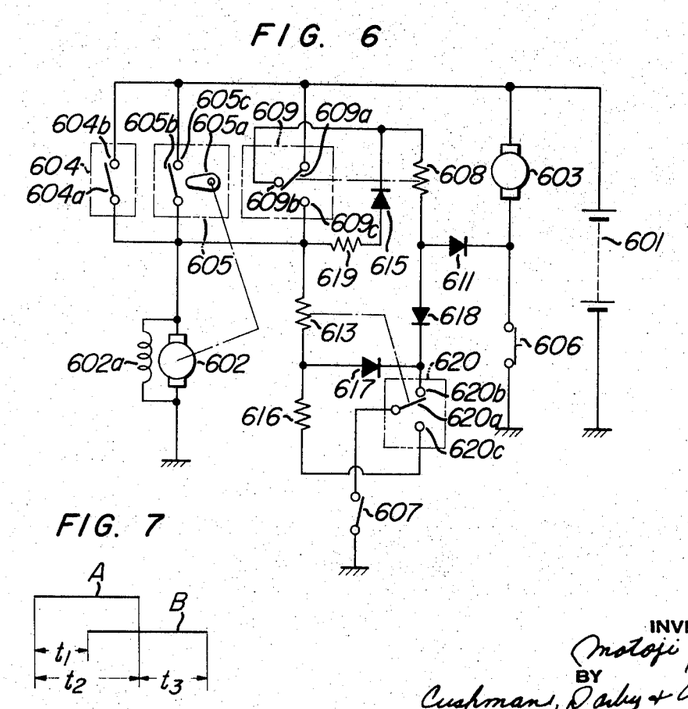
FIG. 6 is a circuit diagram showing a partially modified form of the embodiment shown in FIG. 5.
FIG. 7 is a diagram useful for explaining the time relationship between the operations of the washer and the wiper.

On the other hand, when the washer is to be operated, the washer switch 106 is closed so that the washer motor 103 is instantaneously started operating spraying a washing liquid. Concurrently, a current is supplied to the heating wire 108 so that the temperature responsive switch 109 is indirectly heated by a heat generated in the heating wire 108 and thus the movable contact 109a of the switch 109 is connected to the contact 109c after the lapse of a predetermined time. This establishes a circuit through the power source 101, contact 109c, movable contact 109a, contact 104c, wiper switch blade 104a, wiper motor 102 and power source 101, whereupon the wiper operates in cooperation with the washer. When the operation of the washer is to be stopped, the washer switch 106 is opened so that the washer motor 103 stops its operation immediately and thus the washing liquid is no longer sprayed, while at the same time the current flow in the heating wire 108 is interupted causing the heating wire 108 is interrupted causing the heating wire 108 to stop generating heat, but due to the heat capacity of the temperature responsive switch 109 the movable contact 109a and the contact 109c remain closed until the strip of metal such as a bimetal strip carrying the movable contact 109a of the switch 109 cools down, so that the wiper continues to operate until the washing liquid on the glass surface of the windshield is completely removed. As the temperature responsive switch 109 cools down so that the movable contact 109a engages the contact 109b, the same circuit as established when stopping the wiper motor 102 is provided thus causing the wiper to continue operating until it comes to the stop position, and at the time that the wiper arrives at the stop position the switch blade 105b of the automatic stop switch 105 engages the contact 105c stopping the operation of the wiper motor 102. The associated operation of the washer and the wiper in the sequence of time is illustrated in FIG. 7 in which a solid line A represents the operation of the washer and a solid line B represents the operation of the wiper. In the figure, at the expiration of a time $t_1$ after the start of the operation of the washer, the wiper starts operating and it stops operating at the expiration of a time $t_2$ after the washer which has been in operation for a time $t_3$ is stopped operating.

Next, when the wiper is to be operated intermittently, the intermittent operation switch 107 is closed so that a circuit is established through the power source 101, heating wire 108, variable resistor 110, diode 112, intermittent operation switch 107, movable contact 109a of the temperature responsive switch 109, contact 109b, switch blade 105b of the automatic stop switch 105, contact 105c and power source 101. This causes a flow of current through the heating wire 108 and the heating wire 108 generates heat gradually, indirectly heating the temperature responsive switch 109 and thus connecting the movable contact 109a to the contact 109c after a predetermined time to establish a circuit through the power source 101, contact 109c, movable contact 109a, contact 104c, wiper switch blade 104a and wiper motor 102. When this occurs, the wiper motor 102 comes into operation. At the time that the movable contact 109a of the temperature responsive switch 109 is connected to the contact 109c, the series circuit comprising the heating wire 108, variable resistor 110, diode 112 and intermittent operation switch 107 is short-circuited across it so that the current flow through the heating wire 108 is interrupted and thus the heating wire 108 stops generating heat. Consequently, the temperature responsive switch 109 starts to cool down, but owing to the heat capacity of the switch 109 the movable contact 109a engages the contact 109b with some time delay, so that the same circuit as established for stopping the wiper motor 102 is provided and thus wiper motor 102 is stopped by the automatic stop switch 105. In this case, even if the movable contact 109a of the temperature responsive switch 109 has engaged the contact 109b, so far as the switch blade 105b and contact 105d of the automatic stop switch 105 remain connected, the heating wire 108 remain short-circuited thereacross and thus no current flows through it. Consequently, the instant the wiper motor 102 is automatically stopped, current flows again through the heating wire 108 connecting the movable contact 109a of the temperature responsive switch 109 to the contact 109c and thus operating the wiper motor 102 again. In this manner, the wiper motor 102 repeats the intermittent operation. In this connection, the resting interval of the wiper is the time between the beginning of current flow through the heating wire 108 and the connection of the movable contact 109a of the temperature responsive switch 109 to the contact 109c.

Figure 3:
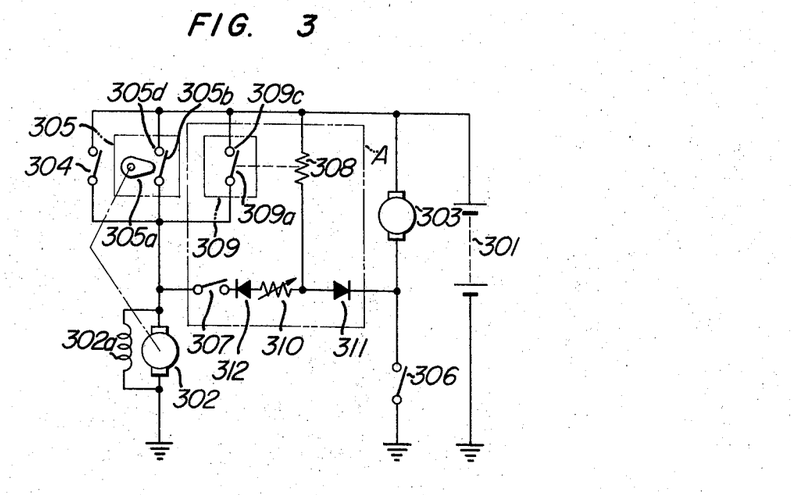
FIG. 3 is a circuit diagram showing another embodiment of the present invention as applied to a wound field type wiper motor.

Next, another embodiment of the system according to the present invention will be explained with reference to FIG. 3. The embodiment of FIG. 3 comprises a wound field type wiper motor 302 in place of the permanent magnet field type wiper motor 102 in the embodiment of FIG. 1 and a closed circuit is established across the armature by a field winding 302a. Thus, as shown in FIG. 3, the required dynamic braking can be effected by means of double-pole type switches 304, 305 and 309 in contrast to the embodiment of FIG. 1 wherein the wiper switch, automatic stop switch and temperature responsive switch consist of three-pole type switches to establish a closed circuit across the armature when the wiper motor is to be stopped. The operation of the embodiment of FIG. 3 will not be explained, since it is basically the same as that of the embodiment shown in FIG. 1.

Figure 2:
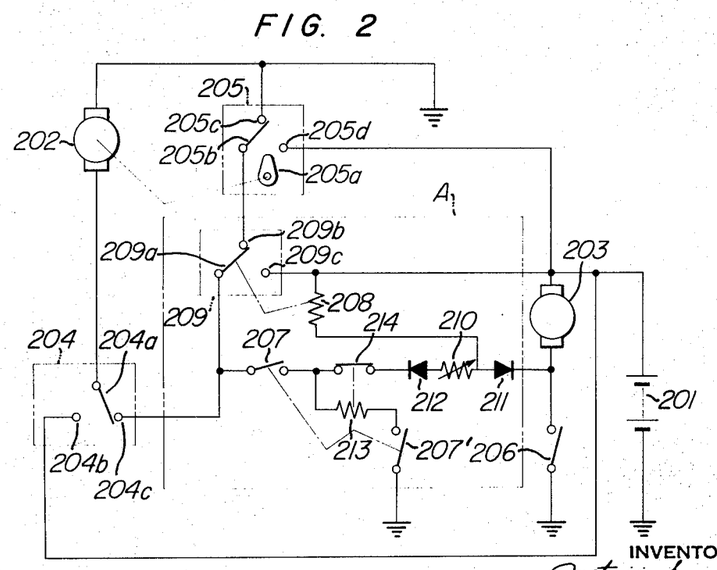
FIG. 2 is a circuit diagram showing a partially modified form of the embodiment shown in FIG. 1.

FIG. 2 illustrates a further embodiment of the present invention which employs a partially modified form of the circuit shown in FIG. 1. The circuit of FIG. 2 is identical with that of FIG. 1 excepting that a switch 207' is additionally provided which operates in association with a temperature responsive switch 214 having normally closed contacts, heating wire 213 and intermittent operation switch 207. The operations of the circuit of FIG. 3 required for actuating the wiper alone and for operating the washer are the same with those of the circuit of FIG. 1 and thus will not be explained. When the intermittent wiping operation of the wiper is to be effected, the intermittent operation switch 207 and the associated switch 207' are closed so that a circuit is established through a power source 201, heating wire 208, diode 212, variable resistor 210, temperature responsive switch 214, intermittent operation switch 207, movable contact 209a of temperature responsive switch 209, contact 209b, switch blade 205b of automatic stop switch 205, contact 205c and power source 201. This causes a flow of current through the heating wire 208 which generates heat gradually and thus the temperature responsive switch 209 is heated indirectly connecting the movable contact 209a to the contact 209c. When this occurs, the wiper motor 202 comes into operation and at the same time the series circuit including the heating wire 208, diode 212, variable resistor 210, temperature responsive switch 214 and intermittent operation switch 207 is short-circuited across it interrupting the current flow and hence the generation of heat in the heating wire 208 and thus the temperature responsive switch 209 starts to cool down. On the other hand, another heating wire 213 is provided in parallel with the wiper motor 202 and thus at the same time that the movable contact 209a of the temperature responsive switch 209 is connected to the contact 209c a circuit is established through the power source 201, contact 209c, movable contact 209a, intermittent operation switch 207, heating wire 213 and switch 207'. Consequently, a current also flows through the heating wire 213 causing it to generate heat and thus indirectly heating the normally closed contacts of the temperature responsive switch 214 to open after the expiration of a predetermined time. In this case, even if the temperature responsive switch 209 cools down causing the movable contact 209a to engage the contact 209b, the current flow through the heating wire 213 is maintained until the wiper motor 202 is automatically stopped, thereby continuously maintaining the temperature responsive switch 214 in the open position. Then, as the wiper motor 202 is stopped automatically so that the current flow through the heating wire 213 is interrupted causing it to stop generating heat, the temperature responsive switch 214 starts to cool down and closes its contacts again after a predetermined time thereby restoring the initial condition in which the current flows again through the heating wire 208 and thus after a predetermined time the movable contact 209a of the temperature responsive switch 209 is connected again to the contact 209c to bring the wiper motor 202 into operation again. In this manner, the intermittent operation of the wiper motor 202 is repeated and according to this embodiment the duration of a dwell period between wiping cycles can be set longer than in the case of the embodiment of FIG. 1 by virtue of the delay in the operation of the temperature responsive switches 214 and 209 before the wiper motor 202 operates again.

By providing the switch 207' which is operatively associated with the intermittent operation switch 207, the heating wire 213, the temperature responsive switch 214, the time delay between the closing of the washer switch 206 and the start of the operation of the wiper is related to the heat capacity of the heating wire 208 alone, whereas the time interval for the intermittent operation of the wiper is determined by the sum of the time delay related to the heat capacity of the heating wire 208 and the time delay related to the heat capacity of the heating wire 213. Thus, the former delay time is shorter than the latter, that is, the wiper starts operating at the expiration of a short period of time after the start of the operation of the washer, whereas the duration of an interval between the intermittent wiping cycles tends to be relatively long. Besides, by adjusting the time delay related to the heat capacities of the heating wires 208 and 213, both of said time delay and time interval can be adjusted as desired.

Figure 4:
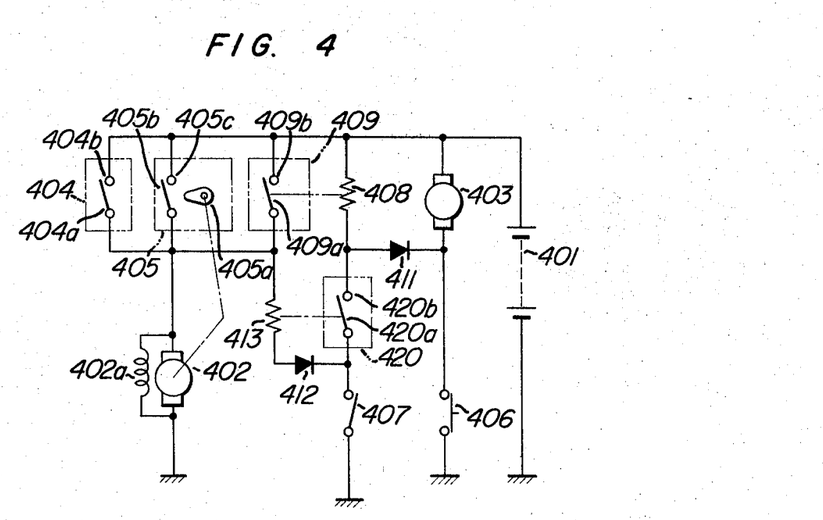
FIG. 4 is a circuit diagram showing a further embodiment of the present invention as applied to a wound field type wiper motor.

FIG. 4 illustrates a still further embodiment of the present invention. In the figure, numeral 401 designates a power source comprising a battery installed in a vehicle; 402 a wound field type wiper motor; 403 a washer motor; 404 a manually operated wiper switch having a movable blade 404a and a contact 404b. Numeral 405 designates an automatic stop switch for stopping the wiper at a fixed position comprising a movable blade 405b, a contact 405c and a cam 405a which operates in association with the wiper motor 402; 406 a manually operated washer switch; 408 a first heating wire connected in parallel with the washer motor 403; 409 a first temperature responsive switch having a movable blade 409a which is capable of snap action such that when heated by the heating wire 408, the movable blade 409a is connected to a contact 409b after a predetermined time. Numeral 413 designates a second heating wire; 420 a second temperature responsive switch having a movable blade 420a adapted to be heated by the heating wire 413 so as to be separated from a contact 420b after a predetermined time; 407 an intermittent operation switch for effecting the intermittent wiping operation of the wiper; 411 a diode for preventing current from flowing through the washer motor 403 and the second temperature responsive switch 420 upon closing of the intermittent operation switch 407; 412 a diode for preventing current from normally flowing through the first heating wire 408, second temperature responsive switch 420, second heating wire 413 and wiper motor 402.

The operation of the circuit described above will now be explained. When the wiper is to be operated alone, the movable blade 404a of the wiper switch 404 is connected to the contact 404b. This establishes a circuit which supplies the wiper motor 402 bringing the wiper into operation. When the wiper is to be stopped, the movable blade 404a of the wiper switch 404 is simply separated from the contact 404b. In this case, the movable blade 405b of the automatic stop switch 405 remains connected to the contact 405c until the wiper is brought to the stop position, establishing a circuit through the power source 401, contact 405c, movable blade 405b of the automatic stop switch 405, and wiper motor 402 and thus causing the wiper motor 402 to continue operating. Then, as the wiper comes to the stop position, the movable blade 405b of the automatic stop switch 405 is separated from the contact 405c by the cam 405a which is operatively associated with the wiper motor 402 thereby stopping the operation of the wiper motor 402.

In order for the washer to come into operation, the washer switch 406 is closed causing the washer motor 403 to operate immediately and thus initiating the spraying of a washing liquid. Concurrently, a current is supplied to the first heating wire 408 so that the movable blade 409a of the temperature responsive switch 409 is indirectly heated by the heat generated in the heating wire 408 and thus the movable blade 409a of the switch 409 is connected to the contact 409b after the expiration of a predetermined time (this period is preset to approximately 0.5 seconds). As a result, a circuit is established through the power source 401, contact 409b, movable blade 409a of the temperature responsive switch 409 and wiper motor 402 causing the wiper motor 402 to start operating. This permits the wiper to wipe the windshield glass surface on to which the washing liquid has been sprayed, thereby avoiding damage to the windshield glass. On the other hand, when the washer is to be stopped, the washer switch 406 is opened so that the washer motor 403 immediately stops operating and thus the washing liquid is no longer sprayed. Concurrently, the current flow through the heating wire 408 is interrupted thus causing it to stop generating heat. In this case, however, owing to the heat capacity of the movable blade 409a of the temperature responsive switch 409, the movable blade 409a remains connected to the contact 409b until the movable blade 409a cools down, so that the wiper continues to operate to the point of the complete removal of the washing liquid on the windshield glass. Then, as the movable blade 409a of the temperature responsive switch 409 gets cold and the movable blade 409a is separated from the contact 409b, until such time that the wiper is brought to stop position, the same circuit as established when stopping the wiper motor 402 is provided causing the wiper to continue operating. When the wiper comes to the stop position, the movable blade 405b of the automatic stop switch 405 separates from the contact 405c thereby stopping the operation of the wiper motor 402.

In order for the wiper to perform the intermittent wiping operation, the intermittent operation switch 407 is closed establishing a circuit through the power source 401, first heating wire 408, contact 420b, movable blade 420a of the second temperature responsive switch 420 and intermittent operation switch 407. Consequently, current flows through the heating wire 408 causing it to generate heat, so that the movable blade 409a of the first temperature responsive switch 409 is indirectly heated connecting the movable blade 409a to the contact 409b after a predetermined time. When this occurs, a circuit is established through the power source 401, contact 409b, movable blade 409a of the temperature responsive switch 409 and wiper motor 402 and thus the wiper motor 402 starts operating. At the same time, a circuit is also established through the power source 401, contact 409b, movable blade 409a of the temperature responsive switch 409, second heating wire 413, diode 412 and intermittent operation switch 407, so that current also flows through the heating wire 413 causing it to generate heat which indirectly heats the movable blade 420a of the second temperature responsive switch 420 thereby separating the movable blade 420a from the contact 420b after a predetermined time. This opens the circuit to the heating wire 408 interrupting the flow of current through the heating wire 408 and thus causing it to stop generating heat. When this occurs, the movable blade 409a of the temperature responsive switch 409 starts to cool down and it is eventually separated from the contact 409b after a certain time delay due to the heat capacity of the blade 409a. In this case, so long as the wiper does not come to the stop position, the movable blade 405b of the automatic stop switch 405 remains connected to the contact 405c causing the wiper motor 402 to continue operating, but the current also continues to flow through the heating wire 413 thus maintaining the movable blade 420a of the second temperature responsive switch 420 in the open position. Then, as the wiper comes to the stop position, the movable blade 405b of the automatic stop switch 405 is separated from the contact 405c automatically stopping the operation of the wiper motor 402. At the same time that the wiper motor 402 stops operating, the current flow through the heating wire 413 is interrupted and thus the heating wire 413 no longer generates heat. This causes the movable blade 420a of the second temperature responsive switch 420 to start cooling down and it eventually engages the contact 420b with a time delay (which is preselected to be of the order of 3 to 4 seconds) as determined by the heat capacity of the blade 420a. When this happens, current is supplied again to the heating wire 408 so that the heating wire 408 generates heat again reconnecting the movable blade 409a of the temperature responsive switch 409 to the contact 409b and thus operating the wiper motor 402 again. In this manner, the wiper motor 402 repeats the intermittent operation. In this connection, it should be noted that the dwell period of the wiper corresponds to the sum of the time between the interruption of current flow through the heating wire 413 and the closing of the blade 420a and contact 420b of the second temperature responsive switch 420 and the time between the start of current flow through the first heating wire 408 and the closing of the movable blade 409a and contact 409b of the first temperature responsive switch 409.

Figure 5:
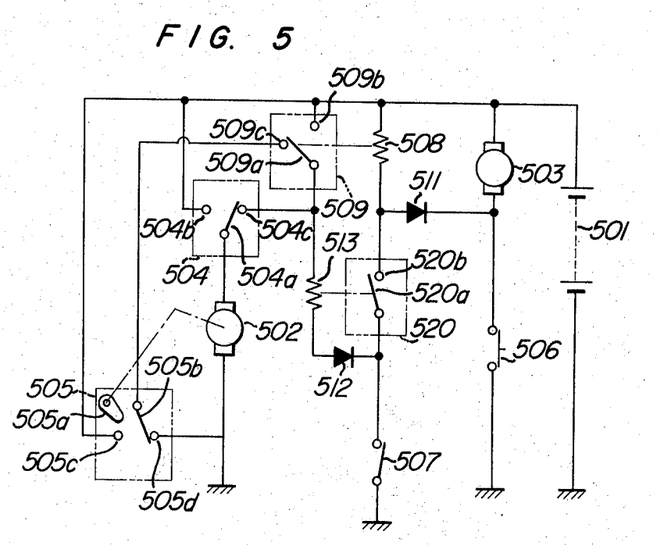
FIG. 5 is a circuit diagram showing a still further embodiment of the present invention as applied to a permanent magnet field type wiper motor.

Referring now to FIG. 5, this embodiment is different from the embodiment of FIG. 4 in that a permanent magnet field type motor 502 is employed in place of the wound field type wiper motor 402. In this embodiment, in order that a closed circuit may be established across the armature to provide a dynamic braking when stopping the wiper motor 502, a wiper switch 504, automatic stop switch 505 and first temperature responsive switch 509 are provided with stop contacts 504c, 505c and 509b, respectively. In this connection, the reason for employing a single-pole single-throw switch for each of the wiper switch 404, automatic stop switch 405 and first temperature responsive switch 409 resides in that a closed circuit is established across the armature of the motor 402 by the field winding 402a as shown in FIG. 4.

FIG. 6 illustrates a still further embodiment of the present invention which is a modification of the embodiment of FIG. 4. In the following description of the construction of this embodiment, only those portions which differ from what are shown in the embodiment of FIG. 4 will be explained. Numeral 608 designates a first heating wire; 609 a first temperature responsive switch having a temperature responsive movable blade 609a capable of snap action such that when heated by the heating wire 608 it is separated, after a predetermined time, from a normally closed side contact 609b and connected to a normally open side contact 609c; 613 a second heating wire; 620 a second temperature responsive switch having a temperature responsive movable blade 620a capable of performing snap action such that when heated by the second heating wire 613 it is separated, after a predetermined time, from a normally closed side contact 620b and connected to a normally open side contact 620c; 619 a resistor for limiting the flow of current through the heating wire 608 to prevent the heating wire 608 from generating heat excessively thereby preventing damage to the movable blade 609a of the temperature responsive switch 609. Numeral 615 designates a diode for preventing current from normally flowing through the movable blade 609a of the temperature responsive switch 609, contact 609b, resistor 619 and wiper motor 602; 616 a resistor for limiting the flow of current through the heating wire 613 to limit the amount of heat generated by the heating wire 613 to the minimum requirement. Numeral 617 designates a diode for preventing current from normally flowing through the movable blade 609a of the temperature responsive switch 609, contact 609b, heating wire 608, heating wire 613 and wiper motor 602; 618 a diode for preventing current from flowing through the heating wire 613 upon closing of the washer switch 606. With the construction described above, the operation of this embodiment required for operating the wiper alone is the same as in the case of the embodiment of FIG. 4 and thus will not be explained here. When the washer is to be operated, the washer switch 606 is closed so that the washer motor 603 comes into operation immediately thus establishing a circuit through a power source 601, movable blade 609a of the temperature responsive switch 609, contact 609b, heating wire 608, diode 611 and washer switch 606. This causes a flow of current through the heating wire 608 and thus the heating wire 608 generates heat, the heat thus generated indirectly heating the movable blade 609a of the temperature responsive switch 609 and thus, after a predetermined time, causing the movable blade 609a to be separated from the normally closed side contact 609b and connected to the normally open side contact 609c. When this occurs, a circuit is established through the power source 601, movable blade 609a of the temperature responsive switch 609, normally open side contact 609c and wiper motor 602 causing the wiper motor 602 to start operating. In this case, the instant that the temperature responsive switch 609 is separated from the normally closed side contact 609b and closed to the normally open side contact 609c, current flows into the heating wire 608 through the resistor 619 and the diode 615 thereby limiting the amount of heat generated by the heating wire 608. On the other hand, when the washer is to be stopped, the washer switch 606 is opened so that the washer motor 603 immediately stops operating interrupting the current flow through the heating wire 608 and thus causing it to stop generating heat. Consequently, the movable blade 609a of the temperature responsive switch 609 starts to cool down and, after a predetermined time, the movable blade 609a is separated from the normally open side contact 609c and closed to the normally closed side contact 609b thereby causing the wiper motor 602 to a stop.

When the wiper is to be operated intermittently, the intermittent operation switch 607 is closed establishing a circuit through the power source 601, movable blade 609a of the temperature responsive switch 609, normally closed side contact 609b, heating wire 608, diode 618, contact 620b, movable blade 620a of the temperature responsive switch 620 and intermittent operation switch 607. Consequently, current flows through the heating wire 608 causing it to generate heat and thus the movable blade 609a of the temperature responsive switch 609 is indirectly heated so that after a predetermined time the movable blade 609a is separated from the normally closed side contact 609b and connected to the normally open side contact 609c causing the wiper motor 602 to start operating. At this time, a circuit is also established through the heating wire 613, diode 617, contact 620b, movable blade 620a of the temperature responsive switch 620 and intermittent operation switch 607 supplying current to the heating wire 613 and thus causing it to generate heat. Consequently, the movable blade 620a of the temperature responsive switch 620 is heated indirectly so that after a predetermined time the movable blade 620a is separated from the normally closed side contact 620b and connected to the normally open side contact 620c disconnecting the circuit to the heating wire 608 and thus causing it to stop generating heat. This in turn causes the movable blade 609a of the temperature responsive switch 609 to cool down so that the movable blade 609a is separated from the normally open side contact 609c and connected to the normally closed side contact 609b after a predetermined time. On the other hand, upon switching of the movable blade 620a of the temperature responsive switch 620 from the contact 620b on to the contact 620c, current flows into the heating wire 613 through the resistor 616 so that the generation of heat by the heating wire 613 is limited. When the wiper motor 602 stops automatically, the current flow through the heating wire 613 is interrupted causing it to stop generating heat and thus the movable blade 620a of the temperature responsive switch 620 starts to cool down. Consequently, after the expiration of a predetermined time the movable blade 620a is changed from the normally open side contact 620c on to the normally closed side contact 620b thus restoring the initial condition. When this occurs, current flows again through the heating wire 608 causing it to generate heat again so that the movable blade 609a of the temperature responsive switch 609 is heated indirectly and thus the movable blade 609a is separated from the normally closed side contact 609b and connected to the normally open side contact 609c causing the wiper motor 602 to operate again. In this way, the wiper motor 602 repeats its intermittent operation. The embodiments of FIGS. 4, 5 and 6 are advantageous in that by additionally providing a second heating wire and a second temperature responsive switch actuated by said second heating wire, the time delay required for operating the wiper and the washer in cooperative manner and the dwell period for intermittently operating the wiper alone can be separately determined.

I claim:

1. A cooperative system of a wiper and a washer comprising in combination:
   a. a wiper motor for operating a wiper;
   b. temperature responsive switch means having normally open contacts connected in series between said wiper motor and a power source;
   c. a heating wire for causing said temperature responsive switch means to respond to a heat and controlling said switch means with a predetermined time delay;
   d. a first parallel connection circuit for connecting said normally open contacts of said temperature responsive switch means in parallel with said heating wire, said circuit including a wiper intermittent operation switch;
   e. a washer motor for operating a washer;
   f. a washer switch connected to said power source in series with said washer motor; and
   g. a second parallel connection circuit for connecting said heating wire in parallel with said washer motor, said circuit including current stopping means for preventing a current from said power source from flowing into said washer motor upon closing said intermittent operation switch.

2. A cooperative system according to claim 1, wherein a variable resistor is provided in the series connection of said heating wire and said intermittent operation switch to make said time delay of said temperature responsive switch means adjustable.

3. A cooperative system according to claim 1 further including an automatic stop switch having normally closed contacts adapted to open only when said wiper is in a predetermined position, said normally closed contacts of said automatic stop switch being connected in parallel with said normally open contacts of said temperature responsive switch means.

4. A cooperative system according to claim 1 further including a second intermittent operation switch operatively associated with said intermittent operation switch, normally closed contacts adapted to open upon closing of said normally open contacts of said temperature responsive switch means, a second heating wire connected to said power source in series with said second intermittent operation switch and said normally closed contacts of said temperature responsive switch means, and second temperature responsive switch means having normally closed contacts operable in response to a heat generated by said second heating wire with a predetermined time delay, said normally closed contacts of said second temperature responsive switch means being provided in the series circuit of said first-mentioned heating wire and said first-mentioned intermittent operation switch.

5. A cooperative system according to claim 1 further including second current stopping means provided in said first parallel connection circuit, whereby when said washer switch is closed during the intermittent operation of said wiper, current is prevented from flowing through the closed normally open contacts of said temperature responsive switch means, said first parallel connection circuit, said second parallel connection circuit, and said closed washer switch from said power source.

6. A cooperative system of a wiper and a washer comprising in combination:
   a. a wiper motor for operating a wiper;
   b. first temperature responsive switch means having normally open contacts connected in series between said wiper motor and a power source;
   c. a first heating wire for causing said first temperature responsive switch means to respond to a heat and controlling said switch means with a predetermined time delay;
   d. a first parallel connection circuit for connecting said normally open contacts of said first temperature responsive switch means in parallel with said first heating wire, said first parallel connection circuit including a second heating wire and normally closed contacts of second temperature responsive switch means responding to a heat generated by said second heating wire and controlled by said second heating wire with a predetermined time delay, the series connection of said second heating wire and said normally open contacts of said first temperature responsive switch means and the series connection of said first heating wire and said normally closed contacts of said second temperature responsive switch means being connected in parallel with each other;
   e. an intermittent operation switch connected to said power source in series with said series connection of said first heating wire and said normally closed contacts of said second temperature responsive switch means;
   f. a washer motor for operating a washer;
   g. a washer switch connected to said power source in series with said washer motor; and
   h. a second parallel connection circuit for connecting said first heating wire in parallel with said washer motor, said second parallel connection circuit including current stopping means for preventing current from flowing into said washer motor from said power source upon closing said intermittent operation switch.

7. A cooperative system according to claim 6 further including an automatic stop switch having normally closed contacts adapted to open only when said wiper is in a predetermined position, said normally closed contacts of said automatic stop switch being connected in parallel with said normally open contacts of said first temperature responsive switch means.

8. A cooperative system according to claim 6, wherein said first parallel connection circuit further includes second current stopping means for preventing current from flowing through said first heating wire, said normally closed contacts of said second temperature responsive switch means, said second heating wire and said wiper motor.

9. A cooperative system according to claim 6 further including normally closed contacts adapted to open upon closing of said normally open contacts of said first temperature responsive switch means and resistor means, said normally closed contacts being connected in series in the series connection of said first heating wire and said normally closed contacts of said second temperature responsive switch means, said resistor means being connected in parallel with said first-mentioned normally closed contacts.

10. A cooperative system according to claim 9, wherein there are further provided normally open contacts adapted to close upon opening of said normally closed contacts of said second temperature responsive switch means, second resistor means, said series connection of said first heating wire and said normally closed contacts being connected in parallel with said series connection of said second heating wire and said normally open contacts of said first temperature responsive switch means through said normally open contacts of said second temperature responsive switch means and said second resistor means, and a short circuit for short-circuiting said last-mentioned series connection through said normally closed contacts of said second temperature responsive switch means.

11. A cooperative system according to claim 10 further including an automatic stop switch having normally closed contacts adapted to open only when said wiper is in a predetermined position, said normally closed contacts being connected in parallel with said normally open contacts of said first temperative responsive switch means.

12. A cooperative system according to claim 10 further including third current stopping means for prevent current from flowing into said short circuit through said normally closed contacts of said first temperature responsive switch means, said first heating wire, said second heating wire, and said wiper motor.

13. A cooperative system according to claim 10, further including fourth current stopping means for preventing current from flowing through said normally open contacts of said first temperature responsive switch means, said second heating wire, said second parallel connection circuit and said washer switch when said washer switch is closed during the intermittent operation of said wiper.

* * * * *